United States Patent
Van Vleck et al.

(10) Patent No.: US 9,426,424 B2
(45) Date of Patent: Aug. 23, 2016

(54) REQUESTING EMERGENCY SERVICES VIA REMOTE CONTROL

(75) Inventors: Paul Van Vleck, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1038 days.

(21) Appl. No.: 12/603,444

(22) Filed: Oct. 21, 2009

(65) Prior Publication Data
US 2011/0093908 A1    Apr. 21, 2011

(51) Int. Cl.
| | | |
|---|---|---|
| H04N 21/422 | (2011.01) | |
| H04H 20/59 | (2008.01) | |
| H04H 60/52 | (2008.01) | |
| H04N 7/173 | (2011.01) | |
| H04N 5/44 | (2011.01) | |
| H04N 7/14 | (2006.01) | |
| H04N 21/4788 | (2011.01) | |
| H04N 21/658 | (2011.01) | |

(52) U.S. Cl.
CPC ......... H04N 7/17318 (2013.01); H04N 5/4403 (2013.01); H04N 7/147 (2013.01); H04N 21/42204 (2013.01); H04N 21/42222 (2013.01); H04N 21/4788 (2013.01); H04N 21/6581 (2013.01); H04H 20/59 (2013.01); H04H 60/52 (2013.01)

(58) Field of Classification Search
CPC .................. H04N 21/42204; H04N 21/42222; H04H 20/59; H04H 60/52
See application file for complete search history.

(56) References Cited

U.S. PATENT DOCUMENTS

| | | | |
|---|---|---|---|
| 6,563,430 B1 * | 5/2003 | Kemink | H04N 21/42202 340/12.22 |
| 6,570,974 B1 | 5/2003 | Gerszberg et al. | |
| 6,583,720 B1 | 6/2003 | Quigley | |
| 6,735,287 B2 | 5/2004 | Vishik et al. | |
| 6,947,411 B2 | 9/2005 | Parker et al. | |
| 7,065,184 B2 | 6/2006 | Vishik et al. | |
| 7,185,282 B1 | 2/2007 | Naidoo et al. | |
| 7,272,145 B2 | 9/2007 | Chen et al. | |
| 7,415,502 B2 | 8/2008 | Vishik et al. | |
| 7,592,912 B2 | 9/2009 | Hasek et al. | |
| 7,630,478 B2 | 12/2009 | Vishik et al. | |
| 7,746,884 B2 | 6/2010 | Van Vleck et al. | |
| 7,778,263 B2 | 8/2010 | Chen et al. | |
| 7,860,962 B2 | 12/2010 | White et al. | |
| 7,873,102 B2 | 1/2011 | Van Vleck et al. | |
| 7,976,006 B2 * | 7/2011 | Frisque | 271/3.14 |
| 2003/0095641 A1 | 5/2003 | Vishik et al. | |
| 2003/0097413 A1 | 5/2003 | Vishik et al. | |
| 2004/0010602 A1 | 1/2004 | Van Vleck et al. | |

(Continued)

*Primary Examiner* — Pinkal R Chokshi
(74) *Attorney, Agent, or Firm* — Jackson Walker L.L.P.

(57) ABSTRACT

A method and system for contacting emergency service providers may allow using a remote control (RC) at a multimedia content distribution network (MCDN) client location. An MCDN user may use the RC, which may be configured to control customer premises equipment at the MCDN client, to signal an emergency event. In response, an MCDN server may be queried for emergency user information associated with the MCDN client and/or the MCDN user. Based on the emergency user information, third parties, such as emergency service providers, medical service providers, or private persons, may be contacted via the MCDN. A communications channel, including audio and/or video, between an emergency service provider and the MCDN client may be initiated based on the emergency user information.

19 Claims, 5 Drawing Sheets

(56) References Cited

U.S. PATENT DOCUMENTS

| | | |
|---|---|---|
| 2004/0022247 A1 | 2/2004 | Chen et al. |
| 2004/0247089 A1 | 12/2004 | Vishik et al. |
| 2006/0009190 A1* | 1/2006 | Laliberte .......... H04L 29/06027 455/404.1 |
| 2006/0203973 A1 | 9/2006 | Vishik et al. |
| 2006/0209857 A1 | 9/2006 | Hicks, III |
| 2006/0251094 A1 | 11/2006 | Van Vleck et al. |
| 2007/0025449 A1 | 2/2007 | Van Vleck et al. |
| 2007/0038773 A1 | 2/2007 | White et al. |
| 2007/0171091 A1* | 7/2007 | Nisenboim et al. ...... 340/825.69 |
| 2007/0192486 A1 | 8/2007 | Wilson et al. |
| 2007/0229274 A1* | 10/2007 | Patel et al. ................. 340/572.4 |
| 2008/0019386 A1 | 1/2008 | Chen et al. |
| 2008/0043641 A1 | 2/2008 | Wilson et al. |
| 2008/0059998 A1 | 3/2008 | McClenny et al. |
| 2008/0079604 A1* | 4/2008 | Madonna ................. G01S 5/02 340/13.24 |
| 2008/0120639 A1 | 5/2008 | Walter et al. |
| 2008/0189736 A1 | 8/2008 | Edwards et al. |
| 2008/0235745 A1* | 9/2008 | Edwards et al. ............. 725/110 |
| 2008/0250468 A1 | 10/2008 | Sullivan et al. |
| 2008/0261514 A1 | 10/2008 | Pratt et al. |
| 2008/0278635 A1* | 11/2008 | Hardacker ......... H04N 5/44582 348/734 |
| 2009/0002981 A1* | 1/2009 | Knibbe ........................ 362/233 |
| 2009/0019542 A1 | 1/2009 | Vishik et al. |
| 2009/0021651 A1 | 1/2009 | Pratt et al. |
| 2009/0025025 A1 | 1/2009 | Van Vleck et al. |
| 2009/0031375 A1 | 1/2009 | Sullivan et al. |
| 2009/0067591 A1 | 3/2009 | Belz et al. |
| 2009/0119181 A1 | 5/2009 | Pratt et al. |
| 2009/0125971 A1 | 5/2009 | Belz et al. |
| 2009/0132355 A1 | 5/2009 | Begeja et al. |
| 2009/0157473 A1 | 6/2009 | Belz et al. |
| 2009/0158369 A1 | 6/2009 | Van Vleck et al. |
| 2009/0158373 A1 | 6/2009 | Belz et al. |
| 2009/0180377 A1 | 7/2009 | Sullivan et al. |
| 2009/0187955 A1 | 7/2009 | Sullivan et al. |
| 2009/0245494 A1 | 10/2009 | Sullivan et al. |
| 2009/0288115 A1 | 11/2009 | Belz et al. |
| 2009/0312059 A1 | 12/2009 | Pratt et al. |
| 2009/0319607 A1 | 12/2009 | Belz et al. |
| 2009/0323711 A1 | 12/2009 | Boarer |
| 2010/0039214 A1 | 2/2010 | Pratt et al. |
| 2010/0039392 A1 | 2/2010 | Pratt et al. |
| 2010/0039393 A1 | 2/2010 | Pratt et al. |
| 2010/0041374 A1 | 2/2010 | Vishik et al. |
| 2010/0042827 A1 | 2/2010 | Pratt et al. |
| 2010/0050270 A1 | 2/2010 | Pratt et al. |
| 2010/0057575 A1 | 3/2010 | Begeja et al. |
| 2010/0058381 A1 | 3/2010 | Begeja et al. |
| 2010/0063863 A1 | 3/2010 | Begeja et al. |
| 2010/0069012 A1 | 3/2010 | Sullivan et al. |
| 2010/0082712 A1 | 4/2010 | Pratt et al. |
| 2010/0088149 A1 | 4/2010 | Sullivan et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0121744 A1 | 5/2010 | Belz et al. |
| 2010/0122285 A1 | 5/2010 | Begeja et al. |
| 2010/0122286 A1 | 5/2010 | Begeja et al. |
| 2010/0122306 A1 | 5/2010 | Pratt et al. |
| 2010/0124905 A1 | 5/2010 | Pratt et al. |
| 2010/0125586 A1 | 5/2010 | Van Vleck et al. |
| 2010/0134338 A1 | 6/2010 | Belz et al. |
| 2010/0138499 A1 | 6/2010 | Belz et al. |
| 2010/0138876 A1 | 6/2010 | Sullivan et al. |
| 2010/0144368 A1 | 6/2010 | Sullivan et al. |
| 2010/0145766 A1 | 6/2010 | Begeja et al. |
| 2010/0149982 A1 | 6/2010 | Pratt et al. |
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0235872 A1 | 9/2010 | Sullivan et al. |
| 2010/0257448 A1* | 10/2010 | Squires ........................ 715/717 |
| 2010/0275237 A1 | 10/2010 | Pratt et al. |
| 2010/0289685 A1 | 11/2010 | Pratt et al. |
| 2010/0289954 A1 | 11/2010 | Sullivan et al. |
| 2010/0302057 A1 | 12/2010 | Pratt et al. |
| 2010/0302058 A1 | 12/2010 | Belz et al. |
| 2010/0319021 A1* | 12/2010 | Emerson et al. ................. 725/33 |
| 2010/0333127 A1 | 12/2010 | Scott et al. |
| 2011/0012710 A1 | 1/2011 | Sullivan et al. |
| 2011/0037574 A1 | 2/2011 | Pratt et al. |
| 2011/0037611 A1 | 2/2011 | Van Vleck et al. |
| 2011/0037635 A1 | 2/2011 | Van Vleck et al. |
| 2011/0037637 A1 | 2/2011 | Van Vleck et al. |
| 2011/0047284 A1 | 2/2011 | White et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0095873 A1 | 4/2011 | Pratt et al. |

* cited by examiner

REQUESTING EMERGENCY SERVICES VIA REMOTE CONTROL

BACKGROUND

1. Field of the Disclosure

The present disclosure relates to remote control functions and, more particularly, to requesting emergency services via remote control.

2. Description of the Related Art

Remote control devices provide convenient operation of multimedia equipment from a distance, including multimedia content distribution network (MCDN) systems. During an emergency, a user of an MCDN client system may be unable to use a telephone to contact emergency services or provide information to emergency personnel.

DESCRIPTION OF THE EXEMPLARY EMBODIMENTS

Figure 1:
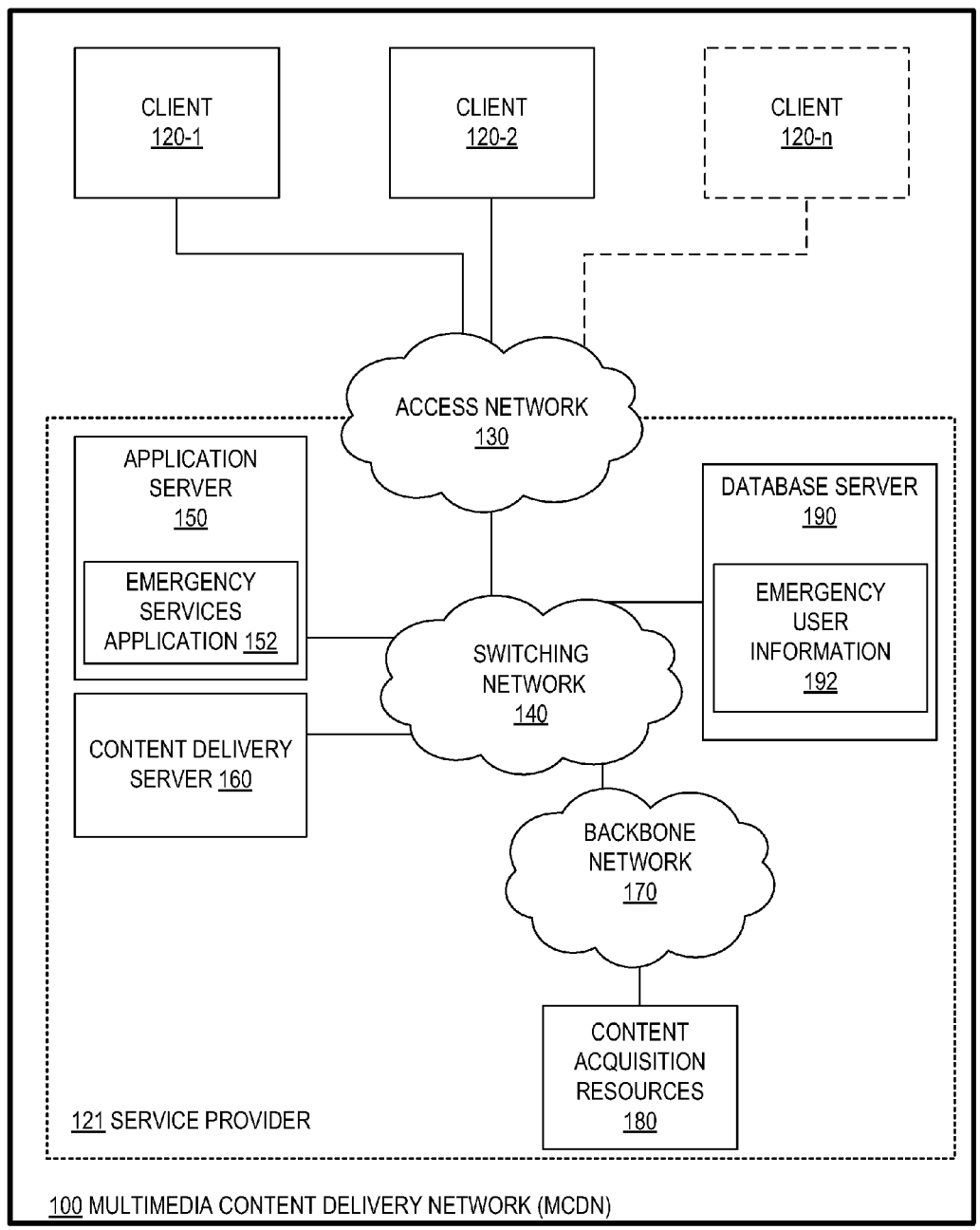
FIG. 1 is a block diagram of selected elements of an embodiment of a multimedia distribution network.

In one aspect, a disclosed method for contacting emergency service providers over an MCDN may include receiving, from a remote control (RC) at an MCDN client, user input indicative of an emergency event, wherein the RC is configured to control customer premises equipment (CPE) of the MCDN. The method may include querying an MCDN server for emergency user information associated with the MCDN client. Based on the emergency user information obtained from the MCDN server, the method may also include notifying, via the MCDN, at least one emergency service provider of the emergency event. Prior to said receiving the user input from the RC, the method may further include receiving emergency user information for an MCDN account associated with the MCDN client.

In certain embodiments, the method operation of notifying may include sending a message via email, a voice-over-Internet-protocol connection (VoIP), a wireless text-messaging system, an instant messaging system, and/or an MCDN messaging system. The emergency user information may include contact information for at least one of: emergency service providers, medical service providers, and personal individuals. The method operation of notifying may also include sending a message including at least one of: an identifier for the MCDN client, a location of the MCDN client, a globally unique identifier (GUID), a location of CPE at the MDCN client location, and network connection information for the MCDN client. The network connection information may include information usable to initiate an audio and/or a video connection using the CPE. The network connection information may include information usable to initiate a bidirectional communication connection using the CPE.

In various embodiments, the method may include receiving, from a notified emergency service provider, a request to establish a communication connection using the CPE, while the communication connection may include at least one of: an audio connection and a video connection. The method may still further include establishing the communication connection with the notified emergency service provider.

In another aspect, a disclosed CPE for use within a client configuration of an MCDN may include a processor configured to access memory media. The memory media may include instructions executable by the processor to receive user input indicative of an emergency event, and access emergency user information associated with an MCDN user account for the CPE. The memory media may further include instructions executable to send, via the MCDN and based on the emergency user information, a message to an emergency service provider, the message indicating the emergency event and a location associated with the MCDN user account. The emergency user information may include contact information for the emergency service provider and location information for the CPE.

In certain embodiments, the CPE may further include a local transceiver coupled to the processor, while the memory media may further include processor instructions executable to receive the user input from an RC via the local transceiver. The memory media may still further include processor instructions executable to determine a position of the RC relative to a plurality of radio-frequency identification (RFID) sensors at the MCDN client location, and use the position as the location associated with the MCDN user account.

In particular embodiments, the CPE may also include a peripheral bus interface coupled to the processor, while the memory media may further include processor instructions executable to receive, from the emergency service provider, a request to establish a communication connection using a peripheral device coupled to the peripheral bus interface, and establish the communication connection with the notified emergency service provider. The peripheral device may include an audio device, while the communication connection may include an audio connection. The peripheral device may include an imaging device, while the communication connection may include an image connection. The peripheral device may include a video camera, while the image connection may include a video connection.

In yet another aspect, a disclosed computer-readable memory media includes executable instructions for accessing emergency services via an RC configured to control CPE of an MCDN. The instructions may be executable to receive, from the RC, user input indicative of an emergency event, and obtain emergency user information associated with a user of the RC. Based on the emergency user information, the instructions may be executable to send a message to an emergency service provider, the message indicating the emergency event and a location associated with the RC. The emergency user information may be obtained from an MCDN server. The message may be sent via the MCDN.

In some embodiments, the memory media may further include instructions executable to receive, from the emergency service provider, a request to establish a communication connection via the MCDN, and establish the communication connection with the emergency service provider.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, Internet-protocol television (IPTV) portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include emergency services application 152, which, as will be described in detail below, may notify an emergency service provider of an emergency event at MCDN client 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, and other equipment at MCDN client 120. As shown in FIG. 1, database server 190 may include emergency user information 192, which may be used by emergency services application 152 to notify emergency service providers and/or to establish communication channels to MCDN client 120.

Figure 2:
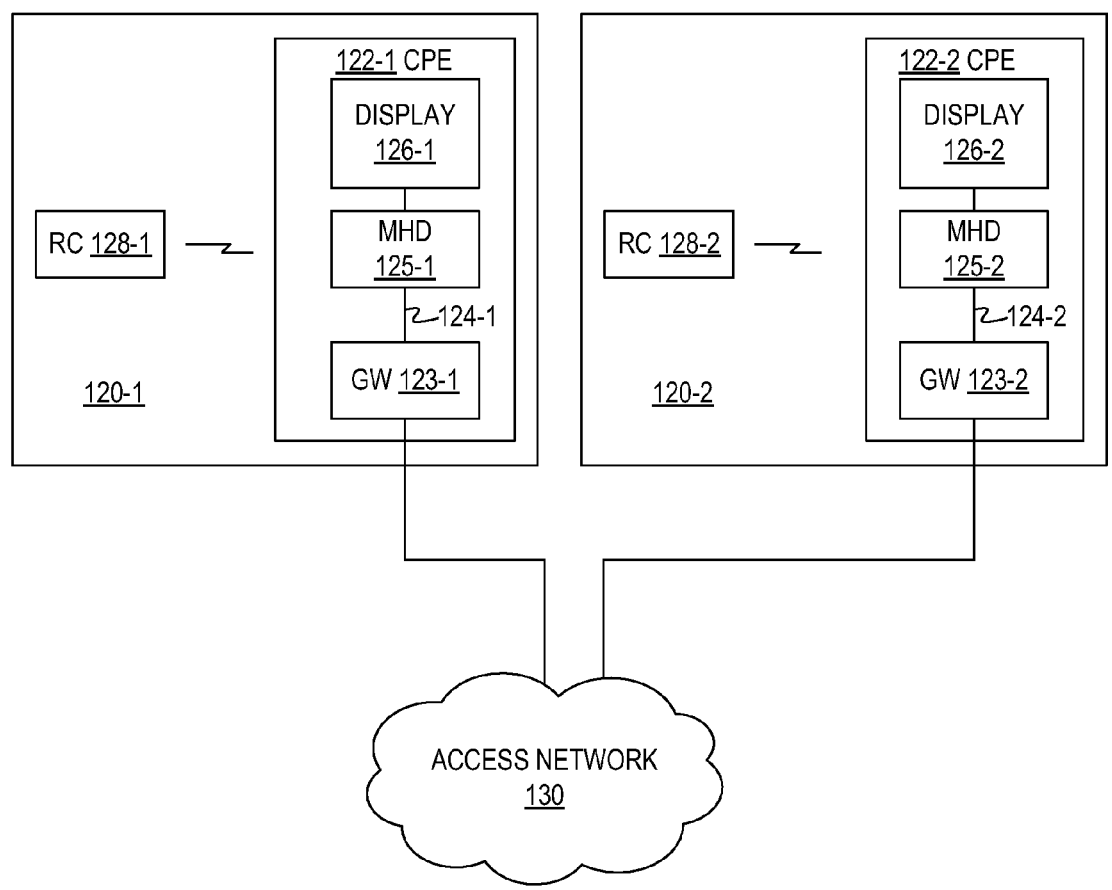
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, remote control 128 may represent a universal remote control device that is configured to control multiple pieces of equipment.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based multimedia content delivery network.

Figure 3:
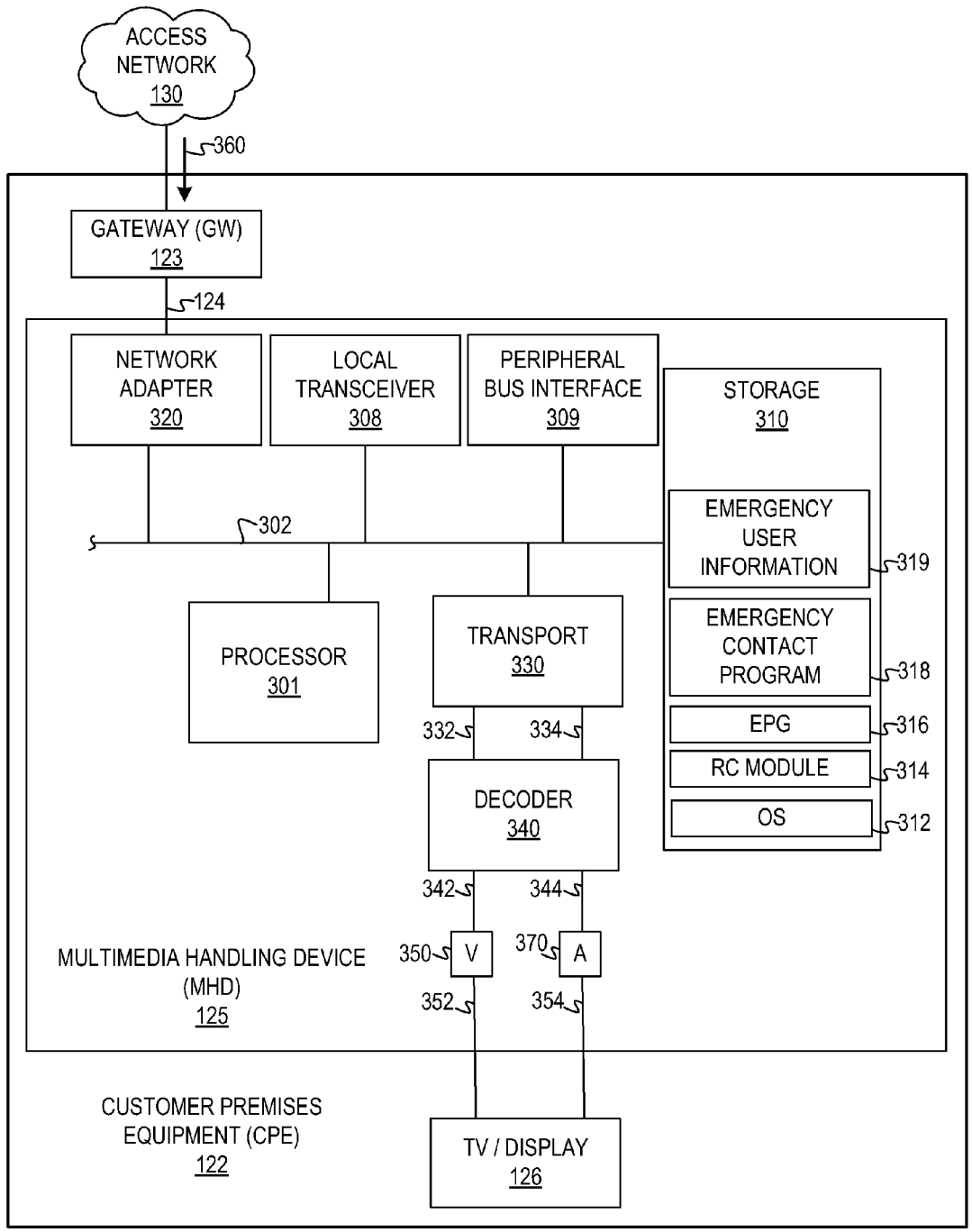
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, EPG 316, emergency contact program 318, and emergency user information 319. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, emergency services application 152 (see FIG. 1), in conjunction with emergency contact program 318, provides functionality to contact an emergency service provider based on user input to remote control 128, as will be described in detail below.

Local transceiver 308 represents an interface of MHD 125 for communicating with external devices, such as remote control 128, or another universal remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by RC module 314 for providing remote control functionality. Also shown with MHD 125 is peripheral bus interface 309, which may be used to couple external peripheral devices to CPE 122 (see also FIG. 4, element 404). Peripheral bus interface 309 may be accessible to storage 310 and processor 301 via local bus 302.

Figure 4:
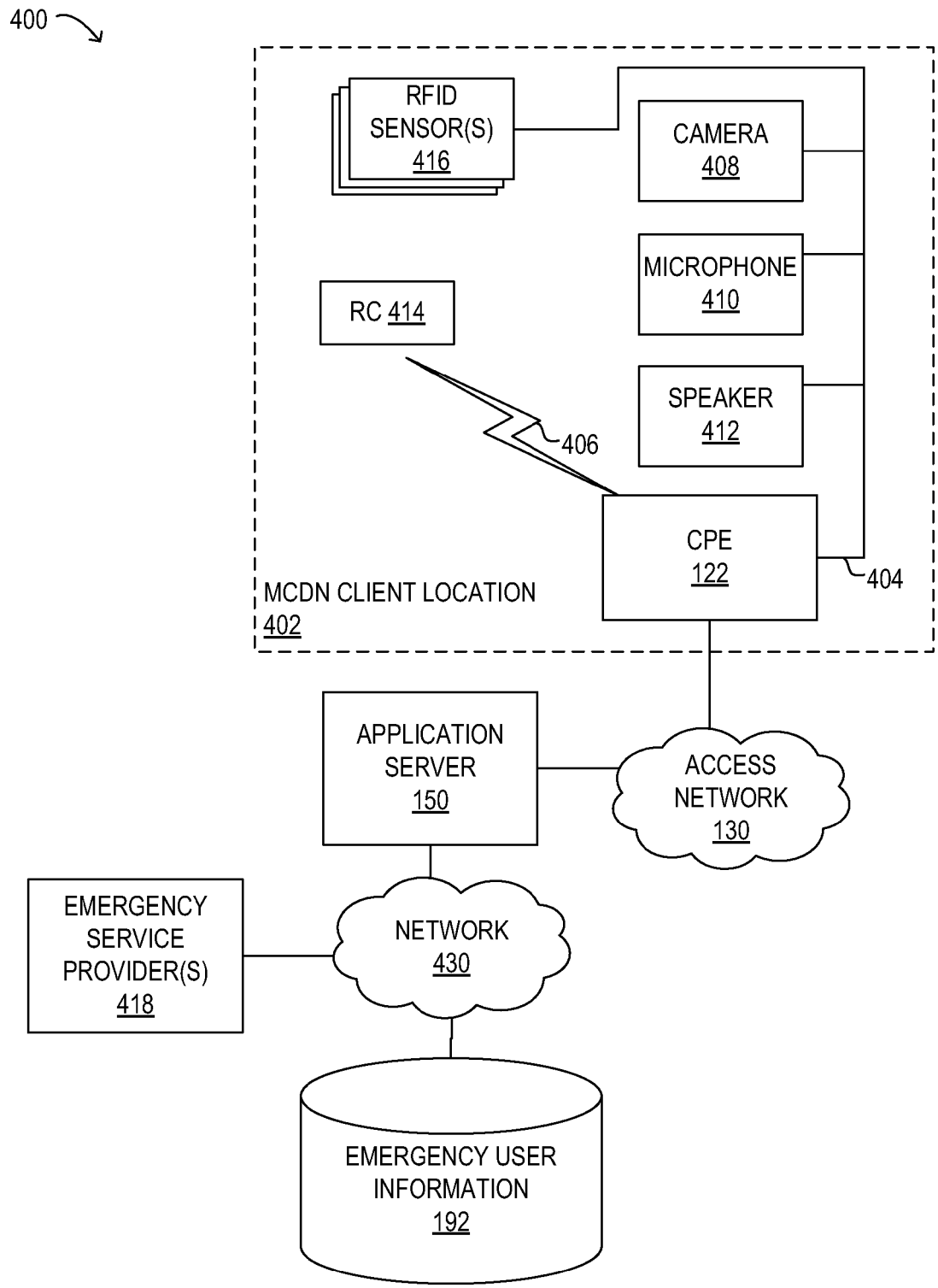
FIG. 4 is a block diagram of selected elements of embodiments of an MCDN system configured to request emergency services.

Turning now to FIG. 4, a block diagram of selected elements of an embodiment of MCDN system 400 is depicted. In MCDN system 400, CPE 122, peripheral bus 404, speaker 412, microphone 410, camera 408, RC 414, and RFID sensor(s) 416 may be at MCDN client location 402, representing a physical location of MCDN client 120 (see FIG. 1). MCDN system 400 illustrates devices, interfaces and information that may be processed, in one embodiment, to notify an emergency service provider of an emergency event at MCDN client location 402. It is further noted that like numbered elements in FIG. 4 represent components discussed above with respect to FIGS. 1-3.

In FIG. 4, RC 414 may be operated by a user (not shown) of remote control CPE 122. For example, RC 414 may be usable to operate EPG 316 and/or to select and receive IPTV channels using CPE 122. RC 414 may also include a control element for notifying CPE 122 of an emergency event, as will be described in detail below. RC 414 may be in communication with CPE via communication link 406. It is noted that in FIG. 4, communication link 406 may be a wireless or mechanically connected interface. For example, communication link 406 may be an IR or an RF interface.

As shown in FIG. 4, CPE 122 may be coupled to peripheral bus 404, which may provide CPE 122 with access to peripheral devices. Examples of peripheral bus 404 include the Universal Serial Bus (USB), and IEEE 1394, among others. Speaker 412 is shown as a peripheral device, which may represent any of a number of audio output devices and/or interfaces, such as loudspeakers, headphones, etc. Microphone 410 is also shown in FIG. 4 as a peripheral device, representing any of a number of audio input devices. Camera 408 is another depicted peripheral device, which may represent a still image camera or a video camera. RFID sensor(s) 416 are yet further peripheral device(s) depicted in FIG. 4. RFID sensor(s) 416 may be placed at various locations within MCDN client location 402 for the purpose of providing more detailed location information. For example, RC 414 may include an RFID tag chip (not shown in FIG. 4), which is detectable by RFID sensor(s) 416. In case of an emergency event, RFID sensor(s) 416 may provide an exact location of RC 414, which, if used to signal the emergency event by the user, may then assist in locating the user requiring emergency services.

In FIG. 4, CPE 122 may itself store emergency user information (not shown in FIG. 4) usable for contacting an emergency service provider. In various embodiments, CPE 122 may query application server 150 via access network 130, which in turn may obtain emergency user information 192 via network 430. It is noted that CPE 122 may obtain and store at least some portions of emergency user information 192 prior to the occurrence of an emergency event, such that CPE 122 is configured to respond to an emergency event with minimal delay.

CPE 122 may further contact emergency service provider(s) 418 in response to a user input indicating an emergency event. In this regard, CPE 122 may send a message to application server 150 via access network 130, which may then forward the message to emergency service provider(s) 418 via network 430. Messages so sent by CPE 122 to emergency service provider(s) 418 may be via email, a VoIP connection, a wireless text-messaging system, an instant messaging system, an MCDN messaging system, or any combination thereof. CPE 122 may accordingly use a number of different means for addressing a recipient of the messages.

It is also noted that emergency service provider(s) 418 may represent a plurality of emergency service providers, such as a paramedic service, a fire department, a police department, etc., while CPE 122 may be configured to send a message to multiple different emergency service provider(s) 418. Thus, in certain embodiments, CPE 122 may send a plurality of messages to a number of different emergency service provider(s) 418 using various combinations of communication means.

The message sent by CPE 122 to emergency service provider(s) 418 in response to an emergency event may further include emergency user information usable to open a communication channel with CPE 122. Messages sent by CPE 122 may therefore include various identifiers associated with CPE 122, such as, but not limited to, an identifier for MCDN client 120, a location of MCDN client 120, a GUID for CPE 122, a location of CPE 122 at MCDN client location 402, and network connection information for MCDN client 120. The identifiers may be usable to initiate an audio and/or video connection to the CPE, which may also be a bidirectional connection.

In operation of MCDN system 400, as shown in FIG. 4, a user (not shown) may experience or be a witness to an emergency event, such as a medical event, a criminal attack, a natural disaster, an accident, an injury, etc. In certain embodiments, the emergency event may cause the user to become incapacitated at some point. A control element in RC 414 that, when activated by the user, may cause RC 414 to send a signal or message to CPE 122 via communication link 406, representing a notification of the emergency event is activated. CPE 122 may then, based on emergency user information 319 stored locally (see FIG. 3) or emergency user information 192 obtained via an MCDN query, contact emergency service provider(s) 418. CPE 122 may request emergency services at MCDN client location 402. CPE 122 may further send a message including detailed location information, such as a location of RC 414 within MCDN client location 402, provided using RFID sensor(s) 416.

The message sent by CPE 122 may still further include identification information for MCDN client 120, as discussed above, which may enable emergency service provider(s) 418 to initiate a communication channel between emergency service provider(s) 418 and CPE 122. CPE 122 may access peripheral devices via peripheral bus 404, as described above, for providing local communications at MCDN client location 402. The communication channel may enable emergency service provider(s) 418 to directly communicate with the user, or to evaluate the emergency situation at MCDN client location 402. The communication channel may originate at a mobile device used by emergency service provider(s) 418, such that communication may occur during travel by emergency service provider(s) 418 to MCDN client location 402 after emergency services at MCDN client location 402 have been requested.

In certain embodiments, MCDN system 400, as described, may be used to request emergency services at a different location than MCDN client location 402. In particular embodiments, MCDN system 400 may also be configured to contact other entities in lieu of, or in addition to, emergency service provider(s) 418, such as medical providers and private persons (not shown in FIG. 4). The interaction with such entities may include substantially similar embodiments as described above with respect to emergency service provider(s) 418. The user may provide information for MCDN system 400 on how to respond to a notification of an emergency event via RC 414, for example, by providing user input to emergency user information 192 and/or 319. In some embodiments, MCDN system 400 may assess a charge to an MCDN user account associated with CPE 122 for emergency event related activity.

Figure 5:
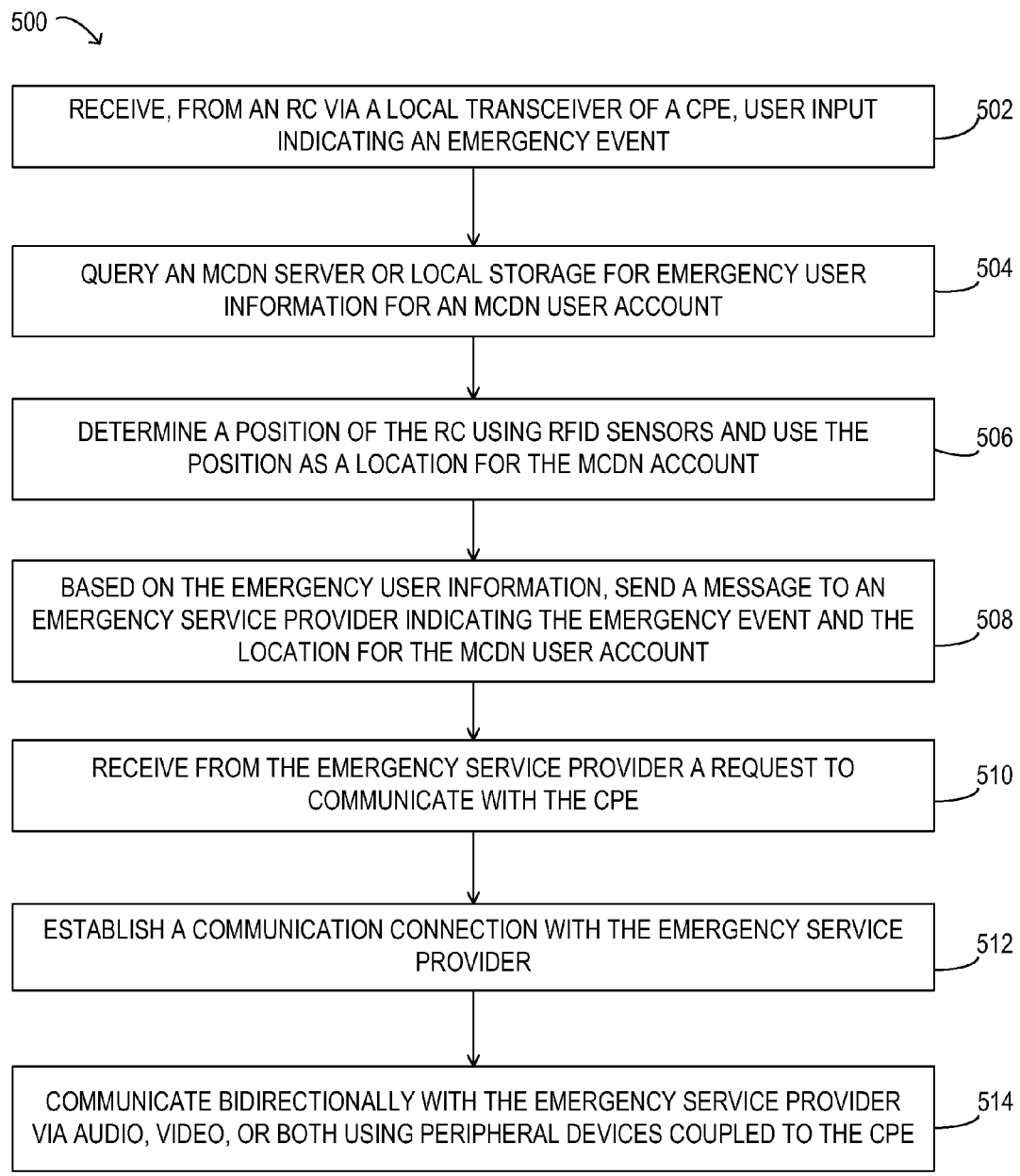
FIG. 5 illustrates an embodiment of a method for requesting emergency services via remote control.

Turning now to FIG. 5, an embodiment of method 500 for requesting emergency services via an RC is illustrated. In one embodiment, method 500 is performed by emergency contact program 318 in conjunction with emergency services application 152. It is noted that certain operations described in method 500 may be optional or may be rearranged in different embodiments. In method 500, it is assumed that a user operates RC 414 for controlling CPE 122.

User input indicating an emergency event may be received from an RC via a local transceiver at a CPE (operation 502). The RC may be configured with a dedicated control element for emergency event notification. An MCDN server or local storage may be queried for emergency user information for an MCDN user account (operation 504). The MCDN user account may be associated with the user providing user input in operation 502 and/or with the CPE. The emergency user information may include information specifying entities or persons to automatically contact in response to the emergency event. In certain embodiments, different types of emergency events may be associated in the emergency user information with different entities, such as a paramedic, a fire department, or a police department.

Next, a position of the RC using RFID sensors may be determined and used as a location for the MCDN account (operation 506). The position of the RC may serve to represent the position of the user, who may have become incapacitated to some degree as a result of the emergency event. Based on the emergency user information, a message to an emergency service provider may be sent, the message indicating the emergency event and the location for the MCDN user account (operation 508). Then, a request may be received from the emergency service provider to communicate with the CPE (operation 510). A communication connection with the emergency service provider may then be established (operation 512). The emergency service provider may establish the communication connection to contact the user or to assess the situation at the MCDN client location with respect to the emergency event. The communication connection may enable the service provider to obtain further information from the user. The communication connection may be a bidirectional connection and may include video and/or audio connections to peripheral devices coupled to the CPE. The emergency service provider may communicate bidirectionally via audio, video, or both using peripheral devices coupled to the CPE (operation 514).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. An emergency service method, comprising:
   receiving, by a customer premises device of a multimedia network client, a remote control signal, indicative of an emergency event, from a remote control for the customer premises device;
   obtaining emergency service information indicative of an address of a customer premises corresponding to the customer premises device;
   obtaining a location of a remote control radio frequency identification (RFID) tag within the customer premises;
   sending, by the customer premises device, an emergency service request to an emergency service provider, the emergency service request including:
      the address of the customer premises; and
      the location of the of the remote control RFID tag within the customer premises; and
      video connection information for establishing a video connection from the customer premises device to the emergency service provider;
   receiving, from the emergency service provider, a request to establish a communication connection with a peripheral device coupled to a peripheral bus interface of the customer premises device; and
   establishing the communication connection between the peripheral device and the emergency service provider.

2. The method of claim 1, wherein obtaining the location of the remote control RFID tag includes:
   obtaining, from a plurality of RFID sensors, sensor information indicative of a position of a remote control RFID tag relative to a particular RFID sensor; and
   determining, by the customer premises device, the location in accordance with the sensor information.

3. The method of claim 1, the customer premises device comprises a set top box.

4. The method of claim 1, wherein the emergency service information includes emergency contact information for a provider selected from: emergency service provider contact information, medical service provider contact information, and emergency contact individuals contact information.

5. The method of claim 1, wherein the emergency service request includes network connection information.

6. The method of claim 5, wherein the network connection information includes audio connection information usable to establish an audio connection with the customer premises device.

7. The method of claim 5, wherein the network connection information includes video connection information usable to establish a video connection with the customer premises device.

8. The method of claim 5, wherein the network connection information includes information usable to establish a bidirectional communication connection with the customer premises device.

9. The method of claim 1, wherein the communication connection includes a connection selected from: an audio connection and a video connection.

10. A customer premises device, comprising:
a processor;
a peripheral bus interface coupled to the processor, and
a computer readable storage medium accessible to the processor, the storage medium including processor executable instructions that, when executed by the processor, cause the processor perform operations comprising:
receiving, by a customer premises device of a multimedia network client, a remote control signal, indicative of an emergency event, from a remote control for the customer premises device;
obtaining emergency service information indicative of an address of a customer premises corresponding to the customer premises device;
obtaining a location of a remote control radio frequency identification (RFID) tag within the customer premises;
sending, by the customer premises device, an emergency service request to an emergency service provider, the emergency service request including:
the address of the customer premises;
the location of the RFID tag within the customer premises; and
video connection information for establishing a video connection from the customer premises device to the emergency service provider;
receiving, from the emergency service provider, a request to establish a communication connection using a peripheral device coupled to a peripheral bus interface of the customer premises device; and
establishing the communication connection with peripheral device and the emergency service provider.

11. The customer premises device of claim 10, wherein the emergency service information includes emergency service provider contact information.

12. The customer premises device of claim 10, further comprising:
a local transceiver coupled to the processor, wherein the operations include:
receiving the remote control signal from the remote control via the local transceiver.

13. The customer premises device of claim 10, wherein the peripheral device includes an audio device, and wherein the communication connection includes an audio connection.

14. The customer premises device of claim 10, wherein the peripheral device includes an imaging device, and wherein the communication connection includes an image connection.

15. The customer premises device of claim 14, wherein the peripheral device includes a video camera and the image connection includes a video connection.

16. A non-transitory computer-readable storage medium, including processor executable instructions that, when executed by a processor, cause the processor to perform operations comprising:
receiving, by a customer premises device of a multimedia network client, a remote control signal, indicative of an emergency event, from a remote control for the customer premises device;
obtaining emergency service information indicative of an address of a customer premises corresponding to the customer premises device;
obtaining a location of a remote control RFID tag within the customer premises;
sending, by the customer premises device, an emergency service request to an emergency service provider, the emergency service request including:
the address of the customer premises;
the location of the radio frequency identification (RFID) tag within the customer premises; and
video connection information for establishing a video connection from the customer premises device to the emergency service provider;
receiving, from the emergency service provider, a request to establish a communication connection using a peripheral device coupled to a peripheral bus interface of the customer premises device; and
establishing the communication connection with the emergency service provider.

17. The computer readable storage medium of claim 16, wherein the remote control signal is indicative of an emergency event and a type of the emergency event.

18. The computer readable storage medium of claim 17, wherein the emergency service information indicates a particular emergency service provider associated with the type of emergency.

19. The computer readable storage medium of claim 18, wherein sending the emergency services request comprises:
sending the emergency services request to the particular emergency service provider.

* * * * *